US006702173B2

(12) United States Patent
Murakami

(10) Patent No.: US 6,702,173 B2
(45) Date of Patent: Mar. 9, 2004

(54) REFLOW APPARATUS IN CONTINUOUS PRINTING AND MOUNTING APPARATUS FOR FILM-LIKE PRINTING BODY

(75) Inventor: Takehiko Murakami, Fuchu (JP)

(73) Assignee: Minami Co., Ltd., Tokyo (JP)

( * ) Notice: Subject to any disclaimer, the term of this patent is extended or adjusted under 35 U.S.C. 154(b) by 28 days.

(21) Appl. No.: 10/229,775

(22) Filed: Aug. 28, 2002

(65) Prior Publication Data

US 2003/0056676 A1 Mar. 27, 2003

(30) Foreign Application Priority Data

Sep. 26, 2001 (JP) ....................................... 2001-293103

(51) Int. Cl.[7] .......................... B23K 37/00; F27D 23/00

(52) U.S. Cl. ............................. 228/39; 228/43; 228/46; 228/47.1; 432/249

(58) Field of Search ........................... 228/178–180.22, 228/256–262, 234.1, 4.1, 6.1, 6.2, 39, 43, 46, 47.1, 49.1, 49.4, 49.5; 432/65, 77, 81, 249; 226/128, 143, 150

(56) References Cited

U.S. PATENT DOCUMENTS 5,167,361 A * 12/1992 Liebman et al. ....... 228/180.22
5,716,207 A * 2/1998 Mishina et al. ............. 432/253
5,957,360 A * 9/1999 Helinski et al. ............ 226/147
6,288,766 B1 * 9/2001 Mashiko et al. ............ 349/189
6,333,206 B1 * 12/2001 Ito et al. ..................... 438/106
6,481,482 B1 * 11/2002 Shimotomai ................ 156/366
6,564,474 B2 * 5/2003 Nagashima .................. 34/638
6,604,662 B2 * 8/2003 Murakami .................. 226/143
2002/0130427 A1 * 9/2002 Kobayashi et al.
2003/0051617 A1 * 3/2003 Murakami
2003/0052149 A1 * 3/2003 Murakami

FOREIGN PATENT DOCUMENTS

JP 410256721 A * 9/1998
JP 411314290 A * 11/1999
JP 2000015431 A * 1/2000
JP 02000260922 A * 9/2000
JP 02003092497 A * 3/2003
JP 02003101211 A * 4/2003

OTHER PUBLICATIONS

U.S. 2003/005676A1, Murakami et al., Mar. 27, 2003.*

* cited by examiner

*Primary Examiner*—Kiley Stoner
(74) *Attorney, Agent, or Firm*—R. Neil Sudol; Henry D. Coleman; William J. Sapone

(57) ABSTRACT

When a movement of a film-like printing body is stopped for a longer time than the normal time because of generation of trouble or the like, heat of hot plates for full heating is prevented from being transmitted to the film-like printing body. All of the hot plates (3, 4, 5, 6, 7, 8) for preheating and full heating are moved downward, and a warp inhibiting body (27) is moved upward. Further, a shutter (34) for shutting off heat is inserted between the film-like printing body (2) and the full heating hot plates (6, 7). Further, at this time, a cold blast is blown to the shutter (34) for shutting off the heat.

3 Claims, 3 Drawing Sheets

REFLOW APPARATUS IN CONTINUOUS PRINTING AND MOUNTING APPARATUS FOR FILM-LIKE PRINTING BODY

BACKGROUND OF THE INVENTION

1. Field of the Invention

The present invention relates to a reflow apparatus in a continuous printing and mounting apparatus for a film-like printing body which executes a printing operation applied to a film-like printing body and a mounting operation of parts in accordance with a continuous process.

2. Conventional Art

A reflow apparatus in accordance with a conventional art is structured such that hot plates for preheating and full heating are sequentially arranged along a moving direction of a film-like printing body, the film-like printing body is directly brought into contact with these hot plates so as to be heated, and a warp inhibiting body for inhibiting the film-like printing body from being warped due to heat is arranged in an upper side of the hot plates so as to hold the film-like printing body thereunder.

However, the following problems are generated in the conventional reflow apparatus mentioned above. This means a point that in the case that movement of the film-like printing body is stopped because of some kind of troubles, for example, generated in a printing step or a parts mounting step, whereby the film-like printing body is in contact with the hot plates, in particular, with the hot plate for full heating which has the highest temperature, for a longer time than the normal time, various kinds of adverse effects are applied to the film-like printing body itself, the printing operation or the like.

SUMMARY OF THE INVENTION

The present invention is made by taking the points mentioned above into consideration, and an object of the present invention is to provide a reflow apparatus structured such as to move all the hot plates apart from the film-like printing body at a time when the movement of the film-like printing body is stopped for a longer time than the normal time because of the generation of trouble or the like, moves the warp inhibiting body upward, and simultaneously insert a shutter for shutting off heat between the film-like printing body and the hot plate for full heating and further, if required, blow a cold blast to this shutter, whereby it is possible to previously prevent the problems mentioned above from being generated.

Then, in accordance with an aspect of the present invention, there is provided a reflow apparatus in a continuous printing and mounting apparatus for a film-like printing body comprising:

- hot plates for preheating and full heating being sequentially arranged along a moving direction of a film-like printing body;
- the film-like printing body being directly brought into contact with the hot plates so as to be heated; and
- a warp inhibiting body for inhibiting the film-like printing body from being warped due to heat, the warp inhibiting body being arranged in an upper side of the hot plate so as to hold the film-like printing body thereunder,
- wherein all of the hot plates are simultaneously moved downward at a suitable timing so as to be made apart from the film-like printing body, the warp inhibiting body is moved upward, and a shutter for shutting off the heat is simultaneously inserted between the film-like printing body at a position of the hot plate for full heating and the hot plate.

Further, as a mechanism for moving the hot plates downward in the structure mentioned above, there can be listed up one particular structure in which support tubes are provided at positions of the respective hot plates in a supporting plate horizontally fixed to a base frame, guide posts suspended to lower surfaces of supporting tables for the respective hot plates are respectively fitted to the support tubes in a slidable manner so as to freely move the hot plates upward and downward, an operation handling shaft suspended to the lower surfaces of the supporting tables for the respective hot plates is respectively fitted to a support tube provided in the supporting plate in a slidable manner, a lower end surface of the operation handling shaft is slidably in contact with cam plates mounted to a rotating shaft which is rotatably supported through bearing bodies fixed to the base frame, and the rotating shaft is connected to a drive motor which is fixed to the base frame via pulleys and a belt, whereby the hot plates are moved downward.

Further, in the structure mentioned above, in addition that the shutter for shutting off the heat is inserted, a cold blast may be blown to the shutter. This case is more effective in view of preventing a temperature of the shutter from being increased, preventing a temperature in the periphery of the film-like printing body from being increased, and preventing the film-like printing body from being warped due to the heat.

DESCRIPTION OF THE PREFERRED EMBODIMENT

A description will be given below of an embodiment in accordance with the present invention with reference to the accompanying drawings.

Figure 1:
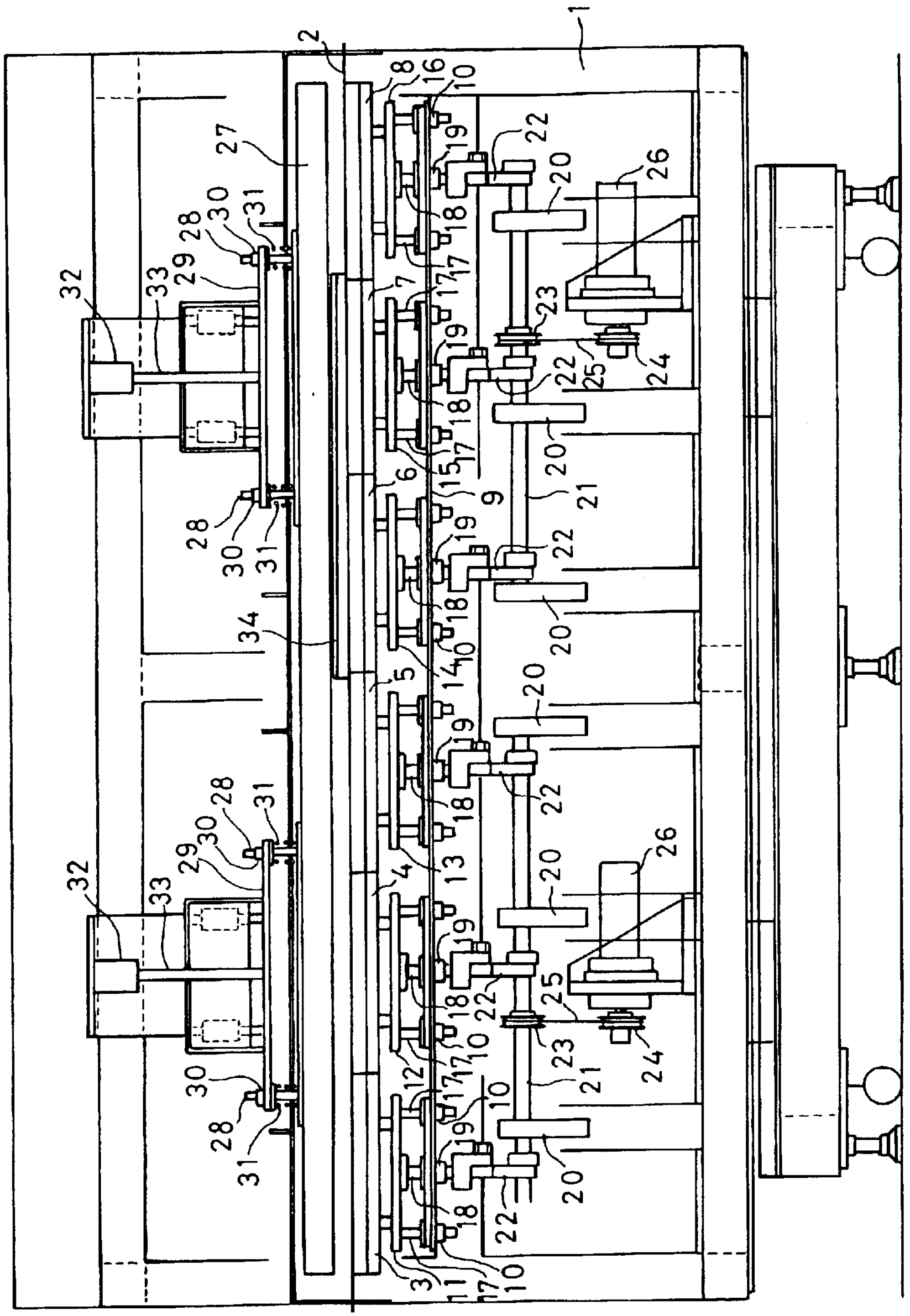
FIG. 1 is a front view of the present invention, with partial omission.
Figure 2:
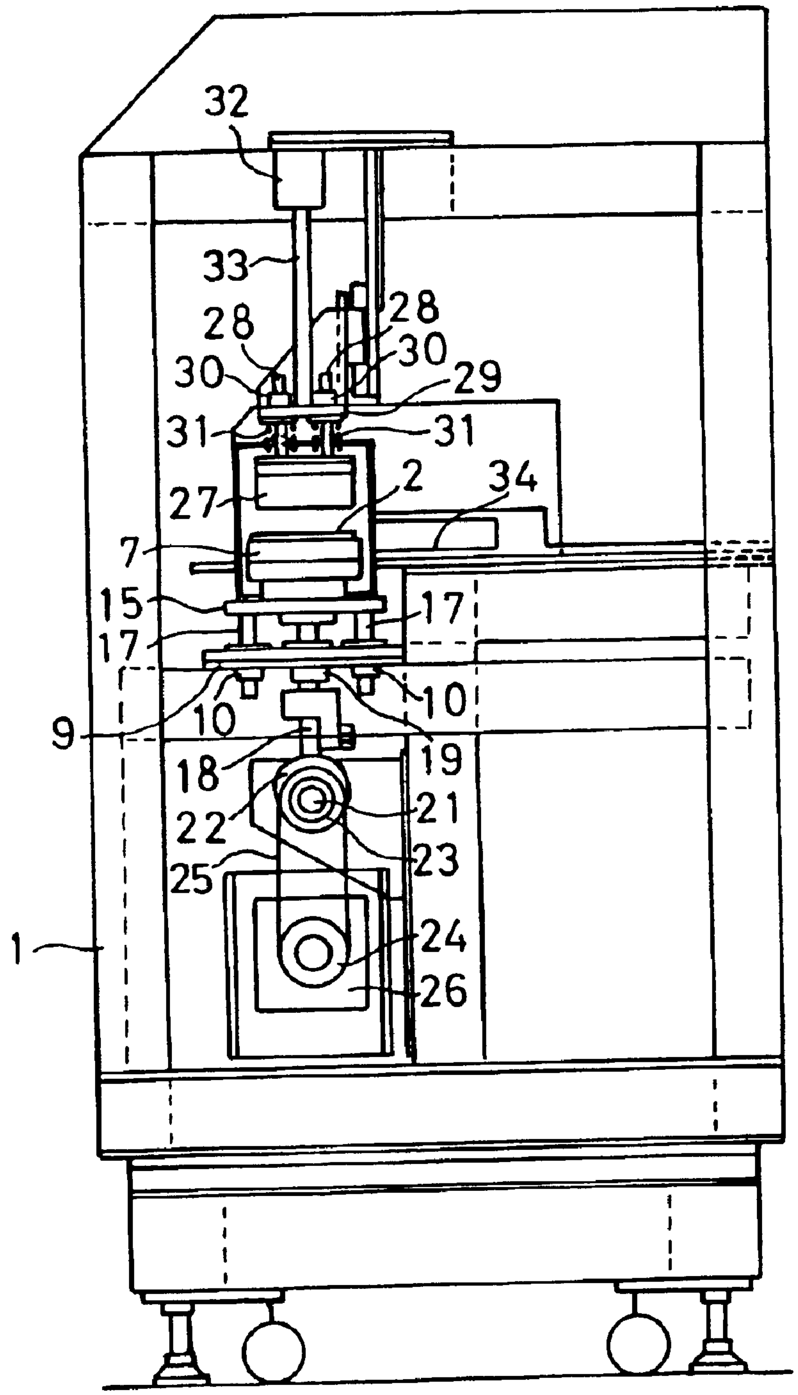
FIG. 2 is a right side view of the present invention.
Figure 3:
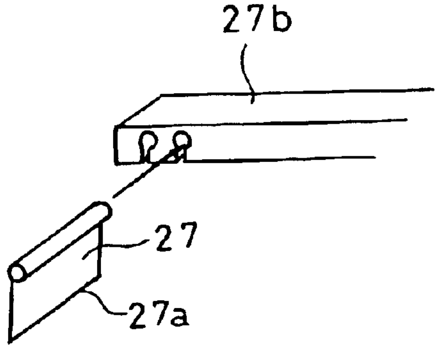
FIG. 3 is a partly enlarged perspective view of a warp inhibiting body in accordance with the present invention.
Figure 4:
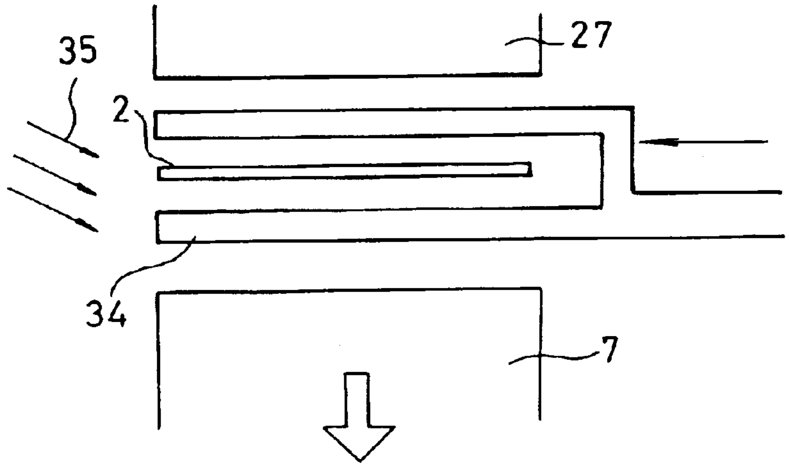
FIG. 4 is a partly enlarged view in a state in which a shutter for shutting heat off is inserted.

FIG. 1 is a front view with partial omission manner, FIG. 2 is a right side elevational view, FIG. 3 is a partly enlarged perspective view of a warp inhibiting body, and FIG. 4 is a partly enlarged view in a state in which a shutter for shutting off heat is inserted.

In the drawings, reference numeral 1 denotes a base frame. Reference numeral 2 denotes a film-like printing body. Reference numerals 3, 4, 5, 6, 7 and 8 denote hot plates which are directly made in contact with the film-like printing body so as to heat the film-like printing body. Among the hot plates, the hot plates 3, 4 and 5 are used for preheating, and the hot plates 6 and 7 are used for full heating. Then, these hot plates 3, 4, 5, 6, 7 and 8 are arranged along a moving direction of the film-like printing body 2 in the order of the preheating hot plates and the full heating hot plates.

Further, the hot plates 3, 4, 5, 6, 7 and 8 are structured such as to be capable of being simultaneously moved downward, and in the present embodiment, the structure is made such that support tubes 10 and 10 are respectively provided at positions of the respective hot plates in a supporting plate horizontally fixed to the base frame 1, guide posts 17 and 17 suspended to lower surfaces of supporting tables 11, 12, 13, 14, 15 and 16 for the respective hot plates 3, 4, 5, 6, 7 and 8 are respectively fitted to the support tubes 10 and 10 in a slidable manner so as to freely move the hot plates 3, 4, 5, 6, 7 and 8 upward and downward, an operation handling shaft 18 suspended to the lower surfaces of the supporting tables 11, 12, 13, 14, 15 and 16 for the respective hot plates is respectively fitted to a support tube 19 provided in the supporting plate 9 in a slidable manner, a lower end surface of the operation handling shaft 18 is slidably in contact with cam plates 22 and 22 mounted to a rotating shaft 21 which is rotatably supported through bearing bodies 20 and 20 fixed to the base frame 1, and the rotating shaft 21 is connected to a drive motor 26 which is fixed to the base frame 1 via pulleys 23 and 24 and a belt 25.

Reference numeral 27 denotes a warp inhibiting body for inhibiting the film-like printing body 2 from being warped due to heat. The warp inhibiting body 27 is arranged in an upper side of the hot plates 3, 4, 5, 6, 7 and 8 so as to hold the film-like printing body thereunder. Further, the warp inhibiting body 27 is constituted, as shown in FIG. 3, by a flat plate member 27*a* which is in contact with an upper surface of the film-like printing body 2, and a holding body 27*b* which mounts a lot of flat plate members 27*a* in parallel.

Further, the warp inhibiting body 27 is structured such as to be capable of being moved upward. In the present embodiment, guideposts 28 and 28 are vertically provided in a holding body 27*b*, the guide posts 28 and 28 are slidably fitted to support tubes 30 and 30 provided in a supporting plate 29, and pressure expanding coil springs 31 and 31 are provided between the supporting plate 29 for the guide posts 28 and 28 and the holding body 27*b*. Further, the structure is made such that the supporting plate 29 is connected to an operation rod (not shown) of a cylinder 32 which is vertically mounted to the base frame 1 via a connection rod 33. In this case, the guide posts 28 and 28 are structured such as to slide within a range of a predetermined stroke.

Reference numeral 34 denotes a shutter for shutting off heat. The shutter 34 is structured such as to prevent the film-like printing body from being exposed to increased heat of the hot plate. Further, the shutter 34 for shutting off the heat is inserted between the film-like printing body 2 at the positions of the full heating hot plates 6 and 7 and the hot plates 6 and 7 at a time when the hot plates 3, 4, 5, 6, 7 and 8 move downward and the warp inhibiting body 27 moves upward. Further, in the present embodiment, the shutter 34 is structured such as to be retracted in a back side of the hot plates 6 and 7 at a time of heating by means of the hot plates, and be moved forward to be inserted between the hot plates 6 and 7 and the film-like printing body 2 at a time of necessity. In this case, the shutter 34 for shutting off the heat is driven by using a cylinder or the other known suitable means.

Further, at a time of inserting the shutter 34 for shutting off the heat, a cold blast may be blown to the shutter 34. In this case, blowing of the cold blast may be performed by using a known suitable means.

Next, a description will be given of an operation of the present embodiment.

In a state shown in FIGS. 1 and 2, in the case that movement of the film-like printing body 2 is stopped because of some kind of troubles, for example, generated in a printing step or a parts mounting step, and the film-like printing body is kept stopped for a longer time than the normal time, all of the hot plates 3, 4, 5, 6, 7 and 8 are simultaneously moveed so as to be made apart from the film-like printing body 2, the warp inhibiting body 27 is moved upward, and the shutter 34 for shutting off the heat is simultaneously inserted between the full heating hot plates 6 and 7 and the film-like printing body 2.

Further, the hot plates 3, 4, 5, 6, 7 and 8 are moved downward in the following manner. That is, when the drive motor 26 is operated, the rotary shaft 21 is rotated via the pulleys 23 and 24 and the belt 25. Accompanying with this, the cam plate 22 is rotated, and the rotation is stopped at a time when the operation handling shaft 18 which is slidably in contact with the cam plate 22 reaches a low mountain portion in the cam plate 22. Accordingly, the hot plates 3, 4, 5, 6, 7 and 8 are simultaneously moved downward.

On the other hand, the warp inhibiting body 27 is moved upward in the following manner. That is, when the cylinder 32 is operated, the supporting plate 29 is moved upward via the connection rod 33, whereby the warp inhibiting body 27 is moved upward.

The present invention has the structure and the operation mentioned above. When the movement of the film-like printing body is stopped for a longer time than the normal time because of the generation of trouble or the like, all of the hot plates are moved downward so as to be made apart from the film-like printing body, the warp inhibiting body is moved upward, and the shutter for shutting off the heat is simultaneously inserted between the film-like printing body and the full heating hot plates. Accordingly, it is possible to shut off the rising heat output from the full heating hot plates having the highest heating temperature with respect to the film-like printing body. Further, in the case of blowing the cold blast to the shutter together with inserting the shutter for shutting off the heat, it is more effective in view of preventing the temperature of the shutter from being increased, preventing the temperature in the periphery of the film-like printing body from being increased, and preventing the film-like printing body from being warped due to the heat.

What is claimed is:

1. A reflow apparatus in a continuous printing and mounting apparatus for a film-like printing body comprising:

hot plates for preheating and full heating being sequentially arranged along a moving direction of a film-like printing body;

the film-like printing body being directly brought into contact with the hot plates so as to be heated; and a warp inhibiting body for inhibiting the film-like printing body from being warped due to heat, said warp inhibiting body being arranged in an upper side of said hot plate so as to hold the film-like printing body thereunder, wherein all of the hot plates are simultaneously moved downward at a suitable timing so as to be made apart from the film-like printing body, the warp inhibiting body is moved upward, and a shutter for shutting off the heat is simultaneously inserted between the film-like printing body at a position of the hot plate for full heating and the hot plate.

2. A reflow apparatus in a continuous printing and mounting apparatus for a film-like printing body as claimed in claim 1, wherein support tubes are provided at positions of the respective hot plates in a supporting plate horizontally fixed to a base frame, guide posts suspended to lower surfaces of supporting tables for the respective hot plates are respectively fitted to said support tubes in a slidable manner so as to freely move said hot plates upward and downward, an operation handling shaft suspended to the lower surfaces of the supporting tables for the respective hot plates is respectively fitted to a support tube provided in said supporting plate in a slidable manner, a lower end surface of said operation handling shaft is slidably in contact with cam plates mounted to a rotating shaft which is rotatably supported through bearing bodies fixed to the base frame, and said rotating shaft is connected to a drive motor which is fixed to the base frame via pulleys and a belt, whereby the hot plates are moved downward.

3. A reflow apparatus in a continuous printing and mounting apparatus for a film-like printing body as claimed in claim 1 or 2, wherein in addition that the shutter for shutting off the heat is inserted, a cold blast is blown to said shutter.

* * * * *